(12) United States Patent
Shimmel et al.

(10) Patent No.: US 9,752,721 B2
(45) Date of Patent: Sep. 5, 2017

(54) PORTABLE EQUIPMENT SYSTEM MOUNT

(75) Inventors: Jeffrey T. Shimmel, Solsberry, IN (US); Todd Mehringer, Jasper, IN (US); Garric Henry, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/249,067

(22) Filed: Sep. 29, 2011

(65) Prior Publication Data

US 2012/0246900 A1    Oct. 4, 2012

Related U.S. Application Data

(60) Provisional application No. 61/387,972, filed on Sep. 29, 2010.

(51) Int. Cl.
| | |
|---|---|
| *F16B 47/00* | (2006.01) |
| *F16M 13/02* | (2006.01) |
| *F41A 23/26* | (2006.01) |

(52) U.S. Cl.
CPC ............ *F16M 13/02* (2013.01); *F41A 23/26* (2013.01); *Y10T 29/49776* (2015.01); *Y10T 29/49826* (2015.01); *Y10T 29/49863* (2015.01); *Y10T 29/49948* (2015.01)

(58) Field of Classification Search
CPC .......... F41A 23/08; F41A 23/16; F41A 23/34; F41A 27/06; B23Q 1/0063; B25Q 1/0063; B25Q 1/0072; B25B 11/00; B25B 11/005; B25B 27/10; B25H 1/00; B21D 39/031; A47J 47/005; A61F 2/9522

USPC ......... 29/281.6, 283.5, 559; 269/309, 289 R, 269/290, 10; 89/40.03, 37.04, 37.03, 89/37.13
See application file for complete search history.

(56) References Cited

U.S. PATENT DOCUMENTS

| | | | | |
|---|---|---|---|---|
| 2,919,058 | A * | 12/1959 | Thompson | 224/546 |
| 3,225,656 | A * | 12/1965 | Flaherty et al. | 89/37.04 |
| 3,777,580 | A * | 12/1973 | Brems | 74/110 |
| 4,326,446 | A * | 4/1982 | Magnuson | 89/38 |
| 5,090,650 | A * | 2/1992 | Donaldson et al. | 248/278.1 |
| 5,467,814 | A * | 11/1995 | Hyman et al. | 165/41 |
| 6,305,117 | B1 * | 10/2001 | Hales, Sr. | 42/94 |

(Continued)

OTHER PUBLICATIONS

Wikipedia, "Engineering Design Process" Feb. 27, 2010.*

*Primary Examiner* — Jacob Cigna
*Assistant Examiner* — Lee A Holly
(74) *Attorney, Agent, or Firm* — Christopher A. Monsey; Eric VanWiltenburg

(57) ABSTRACT

A mounting system having a base plate, multiple mounting apertures adapted to releasably hold a man-portable equipment item, and non-invasive fasteners for attaching to a structure without damaging the structure. The non-invasive fasteners can include adhesive bonded fasteners which couple to a structure without damaging the structure and permit attachment and removal of the mounting system. The base plate and mounting apertures are designed to minimize mounting footprint and orient the man-portable equipment item in relation to a user structure or aperture such as a turret, egress point, portal, or other structure which requires a user to pass through a structure and have immediate access to the man-portable equipment item.

14 Claims, 10 Drawing Sheets

(56) References Cited

U.S. PATENT DOCUMENTS

| | | | |
|---|---|---|---|
| 7,730,824 B1 * | 6/2010 | Black | 89/37.03 |
| 7,784,212 B1 * | 8/2010 | Chilton | 42/94 |
| 8,245,432 B2 * | 8/2012 | Letson | 42/94 |
| 2003/0201634 A1 * | 10/2003 | Kramer | 280/762 |
| 2007/0201302 A1 * | 8/2007 | Lindley | 366/123 |
| 2008/0053300 A1 | 3/2008 | Berkovich et al. | |
| 2011/0197748 A1 * | 8/2011 | Roberts et al. | 89/37.04 |

\* cited by examiner

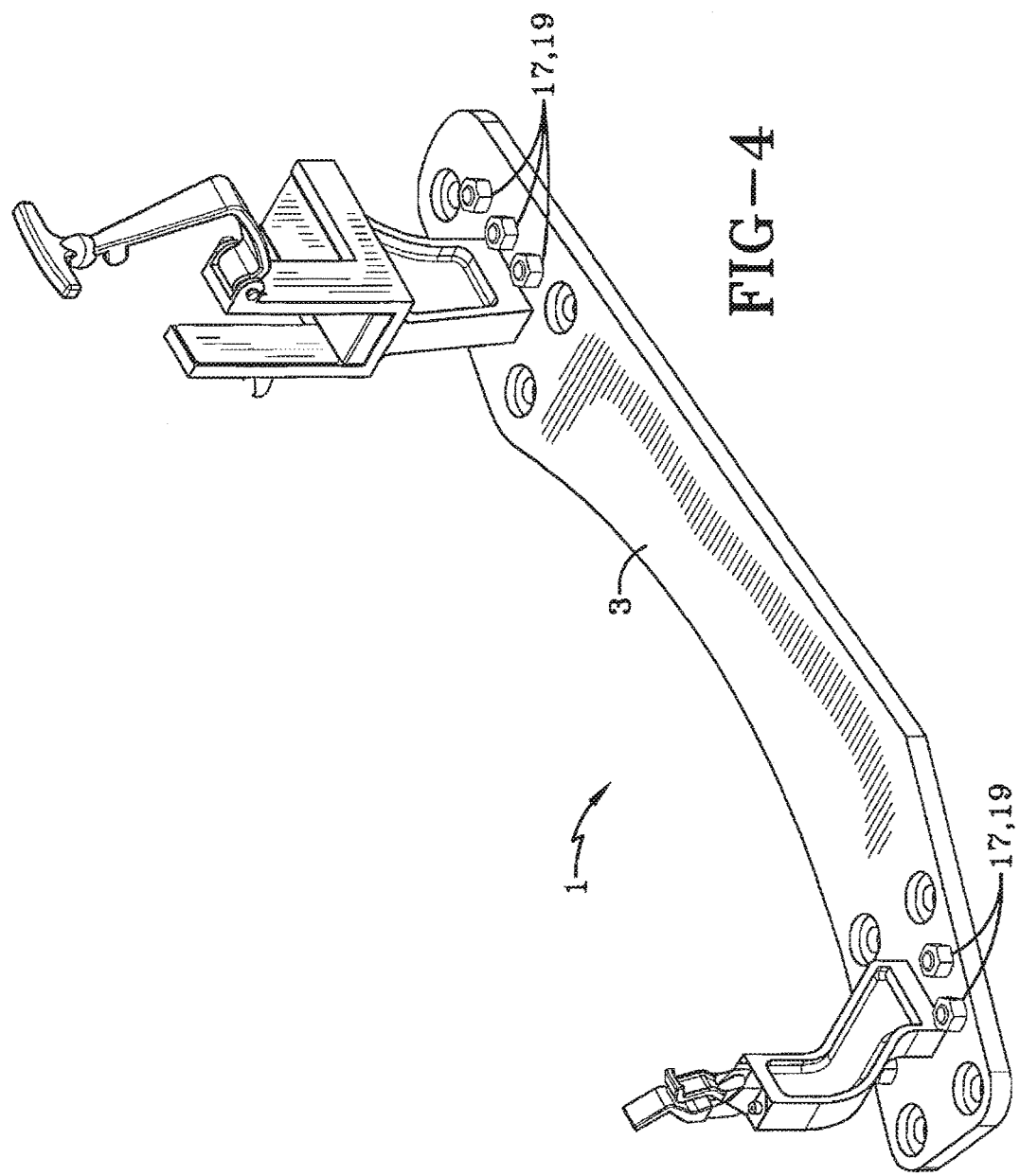

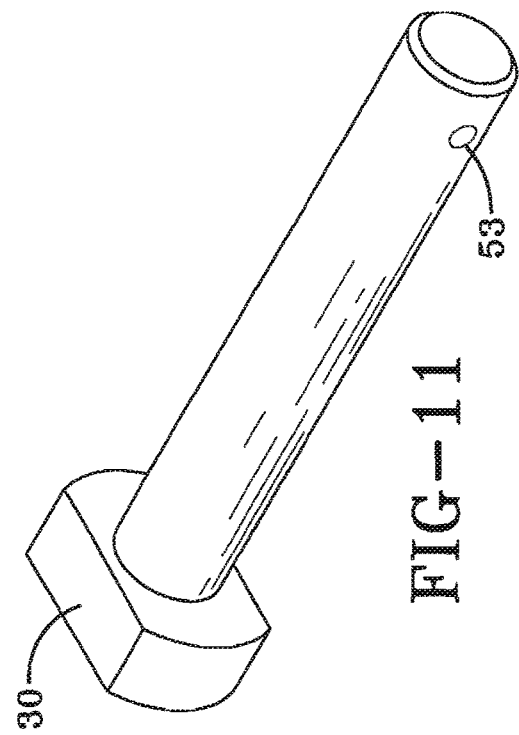
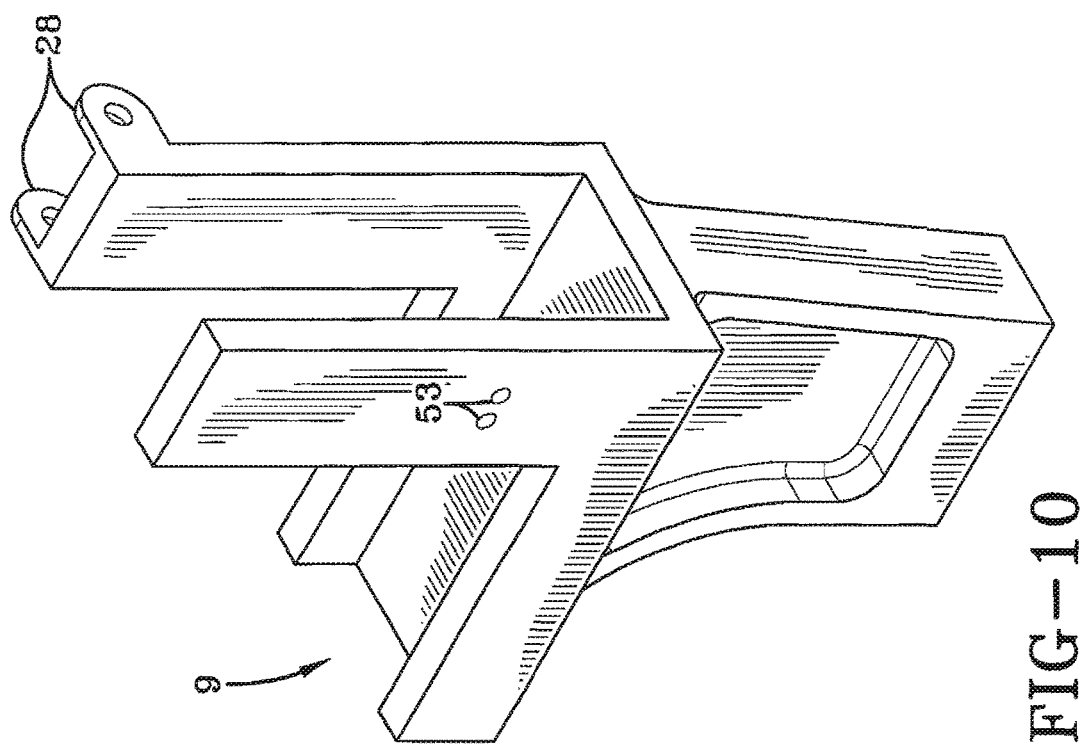

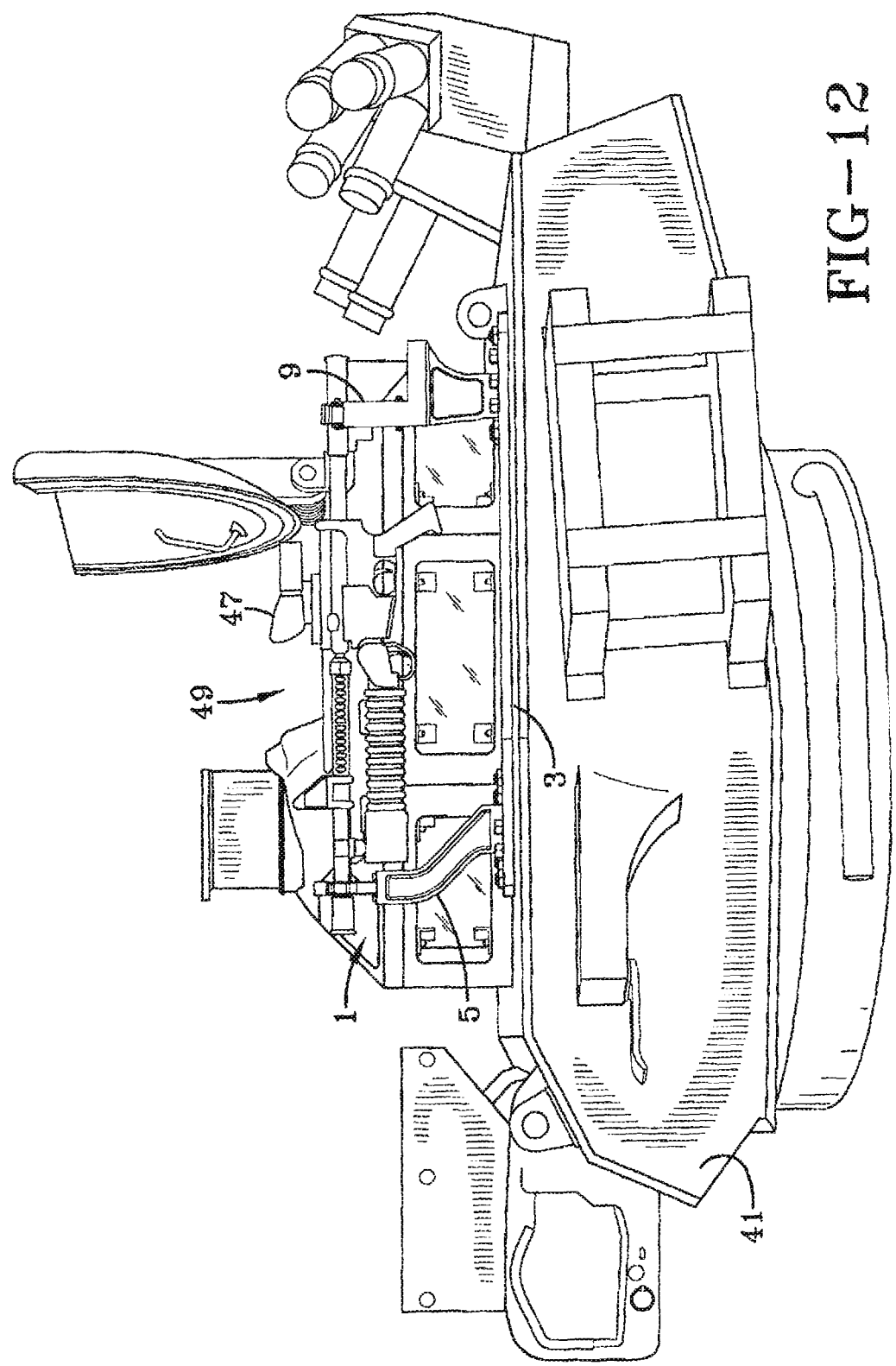

PORTABLE EQUIPMENT SYSTEM MOUNT

CROSS-REFERENCE TO RELATED APPLICATION

The present application claims priority to U.S. Provisional Patent Application Ser. No. 61/387,972, filed Sep. 29, 2010, the disclosure of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used, licensed by or for the United States Government without payment of any royalties thereon.

FIELD OF THE INVENTION

The present invention relates to a system and apparatus for an improved mounting system for removable equipment items which are operable in areas with limited mounting surface area, are subject to substantial forces and impacts, and is capable of quickly receiving and releasing an item which is used in conjunction with the invention.

BACKGROUND OF THE INVENTION

A need arose for a stationary equipment mount to be designed and located atop a vehicle which was designed for traversing rough terrain and in proximity to blast or other hostile environments where a user will require rapid access to an equipment item such as a projectile firing system. In particular, a need existed for an improved equipment mount which was usable on a vehicle or turret system which included a hatch for a user to access the environment outside the vehicle or turret where the equipment item was located for ready access and use. A ruggedized equipment mounting system which positioned the user's equipment item in such a way that it maintained coupling with the equipment item in an orientation which was quickly accessible and usable for the user and was able to function on a vehicle with a stiff vehicle suspension system and traversal over various terrains including extremely rough terrain. Moreover, this mounting system was designed to operate on vehicles or structures which were required to maintain pressure or watertight integrity such as amphibious vehicles or pressurized vehicles.

Existing systems were unable to provide a desired mounting capability thus were susceptible to allowing equipment items to be dislodged and possibly falling off the vehicle. When a mounting failure occurred, a user was obliged to get down from the vehicle to retrieve the equipment item. During the retrieval process, the user was exposed to a dangerous situation where they are vulnerable to a hostile environment.

A number of design and prototyping efforts were conducted with a number of hardware designs attempted for use with unsatisfactory results. Testing and design efforts included using equipment replicas with a variety of potential design efforts to ascertain usability to address the need and problems giving rise to this invention. A variety of problems were encountered in attempting to create a space constrained mounting footprint which positioned the equipment item in a position which was quickly accessible to a user as well as capable of avoiding a variety of structural failures in environments where the mounting system would operate.

Accordingly, a new mounting system which was usable under the above described conditions was needed as such a capability did not exist.

SUMMARY OF THE INVENTION

A mounting system is provided having a base plate, multiple mounting armatures adapted to releasably hold a man-portable equipment item, and non-invasive fasteners for attaching to a structure without damaging the structure. The non-invasive fasteners can include adhesive bonded fasteners which couple to a structure without damaging the structure and permit attachment and removal of the mounting system. The base plate and mounting armatures are designed to minimize mounting footprint and orient the man-portable equipment item in relation to a user structure or aperture such as a turret, egress point, portal, or other structure which requires a user to pass through a structure and have immediate access to the man-portable equipment item. For example, an exemplary embodiment of the invention can position a man-portable user equipment item is in proximity to a user hatch in a turret where the user has quick access to an equipment item.

BRIEF DESCRIPTION OF THE DRAWINGS

The detailed description of the drawings particularly refers to the accompanying figures in which:

FIG. 4 shows an embodiment of the invention such as shown in FIG. 1 removed from a mounted position or in a stored position;

FIG. 10 shows a perspective view of a rear support of a mounting system embodiment of the invention such as shown in FIG. 1;

FIG. 11 shows a perspective view of a pin used with a retaining structure used in accordance with one embodiment of the invention such as shown in FIG. 1;

FIG. 12 shows a side view of an embodiment of the invention such as shown in FIG. 1 attached to a turret structure having a hatch structure.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
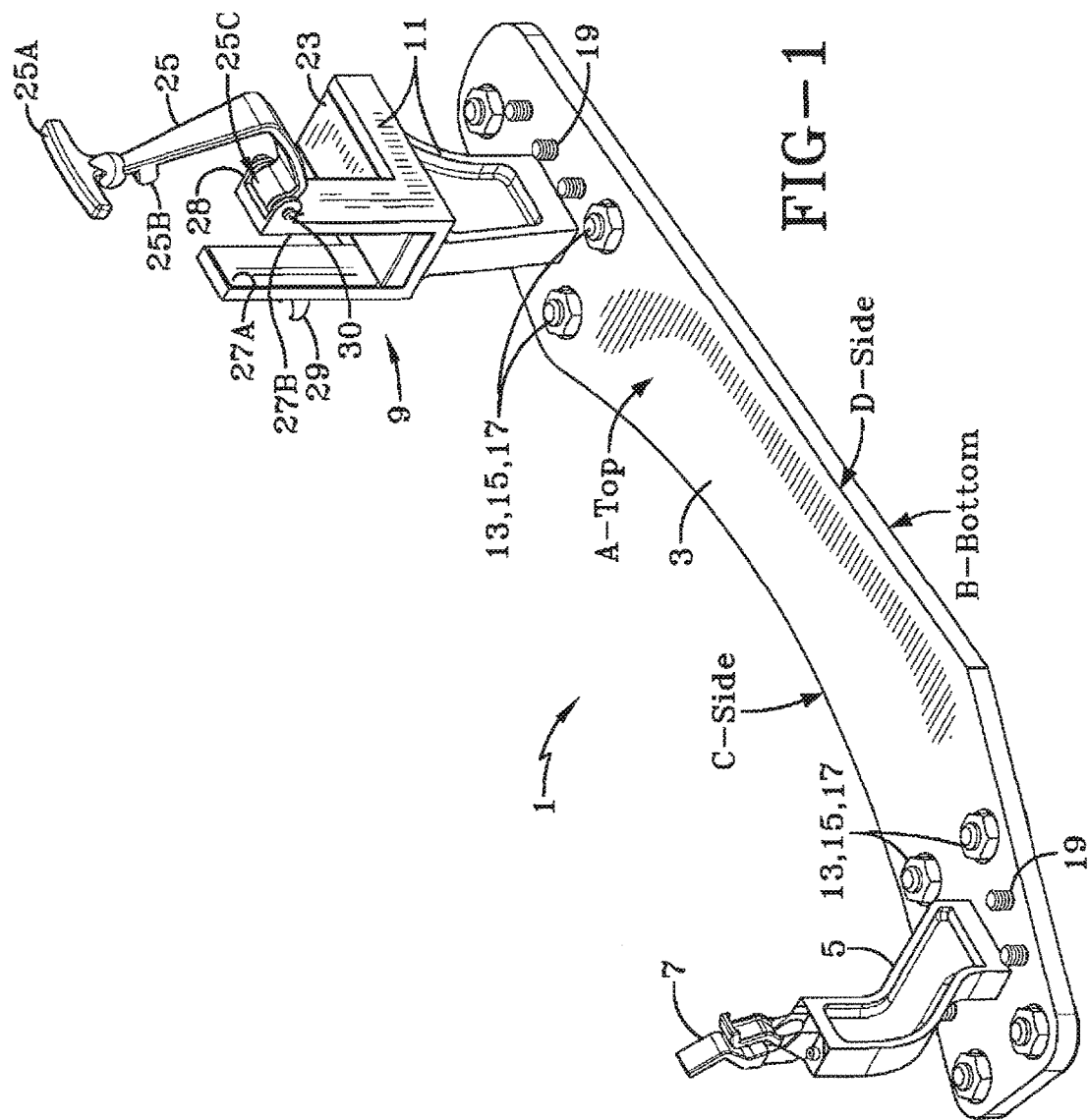
FIG. 1 shows a isometric view of a mounting system in accordance with one embodiment of the invention.

Referring to FIG. 1, a perspective isometric top view on an embodiment of the invention is shown. A mounting or base plate 3 is provided having a top side A and a bottom side B formed with a curving side C which permits the mounting system 1 to be positioned closely to an opening or aperture in a vehicle or structure. The base plate 3 receives and mounts a front support assembly or first mounting structure 5, and a rear support assembly or second mounting structure 9 on top side A of the base plate 3.

The front support assembly 5 is formed with a longitudinal member which extends approximately diagonally from where it mounts on the base plate 3 so the mounting point with the base plate 3 is underneath an equipment item (not shown) which the mounting system 1 receives. Thus, the laterally displacing (e.g., diagonal form) of the front support assembly 5 reduces the size of the base plate 3 by the distance from where top of the front support assembly 5 is formed to where the lower section of the front support assembly couples with the base plate 3. In other words, the approximately diagonal/curved form of the front support assembly permits a shortening of the base plate 3 thus a reduction of coupling area between the mounting system 1 and a structure or vehicle which the mounting system 1 rests upon. This reduction of mounting or coupling area permits mounting of larger systems on areas where little mounting area or footprint is available.

One embodiment of the front support assembly 5 is made from 6061-T6 aluminum alloy however another material can be used that is selected based on kinetic force expected to be applied to the mounting system 1, an equipment item which is to be mounted, as well as attributes of a hostile environment the mounting system 1 is expected to operate within.

In this embodiment, holes are drilled on opposing ends of the longitudinal member making up the front support assembly 5 for receiving fastener structures which couple the front support assembly 5 to a quick release mechanism 7 on one end and base plate 3. This embodiment of the front support assembly 5 has the longitudinal member formed with an I-beam type cross section form (e.g., see FIGS. 8 and 9) which provides requisite strength and reduces weight. An alternative embodiment can include a plate or rectangular structure forming the longitudinal portion of the front support assembly 5 which has holes cut in the plate or structure's body to reduce weight but still provide required stiffness and ability to maintain a removable equipment item in a fixed position while the mounting system 1 is subjected to a variety of forces. The forces affecting the mounting system 1 can include lateral, vertical, longitudinal forces, yaw forces, etc created either by environmental factors or movement of a structure to which the invention is attached.

The front support assembly 5 has a quick release mechanism 7 attached to an end of the front support assembly 5 opposite the end which is coupled to the base plate 3. In this embodiment, the quick release mechanism is a clamping mechanism, such as a spring clamp 7 adapted to receive a barrel of a projectile firing system such as a rifle (not shown). The quick release mechanism in this embodiment permits an equipment item to be pulled upwards and away from the mounting system 1 after application of force sufficient to dislocate the spring clamp 7. The retaining force applied by the quick release mechanism 7 is designed based on the range of motion that a user would have accessing a mounted equipment item from an aperture such as a turret in an armored vehicle, ship, spacecraft, aircraft, etc.

The height of a top section of the front support assembly 5 from the base plate 3 is determined based on the equipment to be mounted, the structure which the mounting system 1 is attached to, and a user orientation or position with regard to the equipment item that the mounting system 1 releasably receives and holds. In this example, the height of a top section of the front support assembly 5 which receives the quick release mechanism 7 is between seven and ten inches as measured from the base plate 3. The lateral offset of the top portion of the front support assembly 5 which couples to the quick release mechanism from the bottom portion of the front support assembly 5 which couples to the base plate 3 in this embodiment is approximately six to seven inches. More or less lateral offset between the top and bottom sections of the front support assembly 5 that respectively couple to a quick release 7 (e.g., spring clamp) and base plate 3 may be desirable given the shape and length of an equipment item which is to be placed into the mounting system 1. The offset dimensions are determined based on an objective of minimizing a mounting footprint of the mounting system 1 while still providing sufficient positioning to permit quick, ergonomic, and/or natural access to the equipment item by a user.

Figure 9:
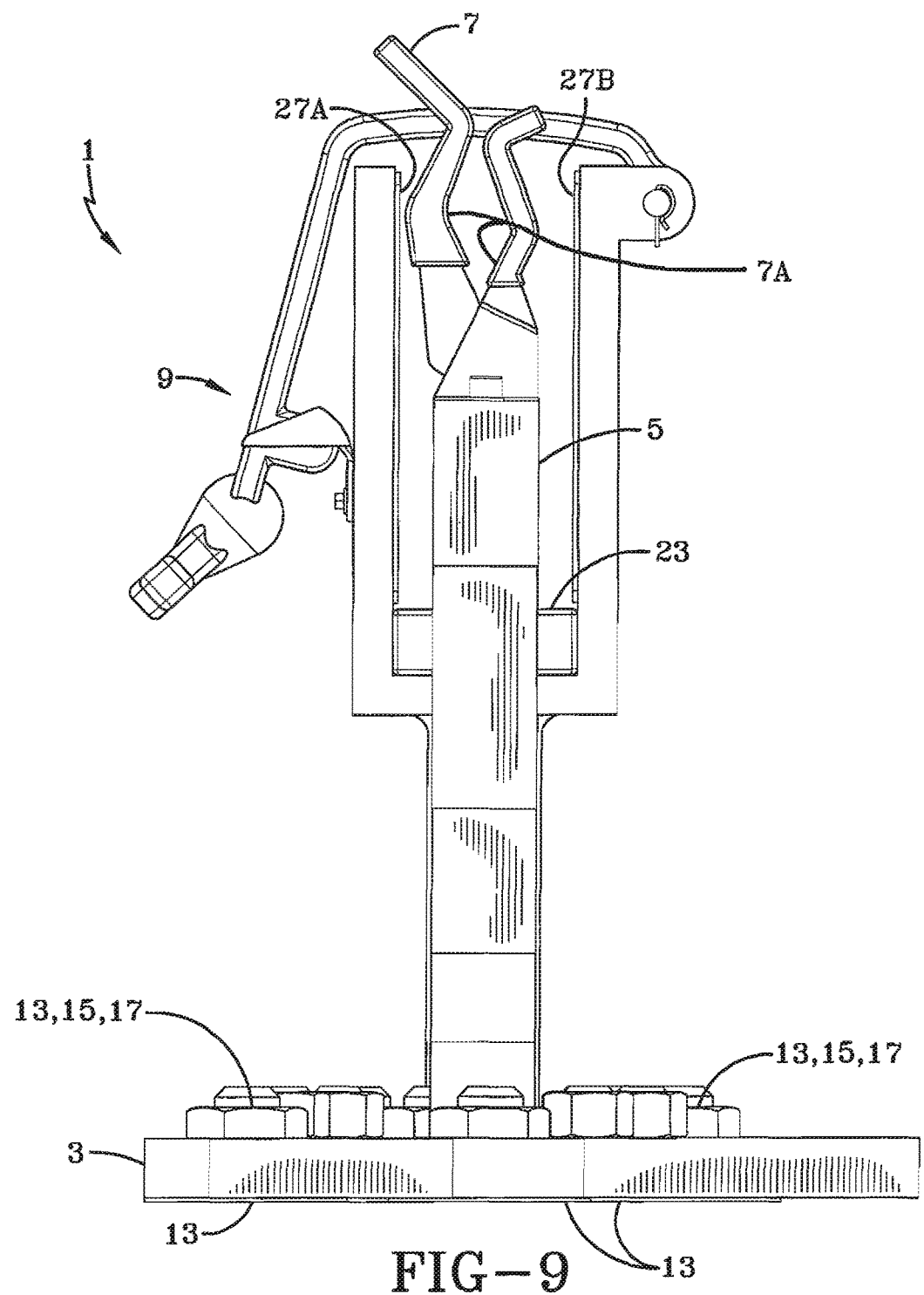
FIG. 9 shows a front view of the embodiment of the invention shown in FIG. 1.

The front support assembly 5 can also include an interface structure or cushion 7A shown in FIG. 9 placed between and on the floor of the spring clamp or quick release mechanism 7. The front support system cushion 7A is provided to dampen vibration or movement of an equipment item in the clamp or quick release mechanism 7 which holds a section of an equipment item (e.g., rifle barrel in this example).

The rear support assembly 9 is designed to firmly receive and releasably release another section of an equipment item the mounting system 1 is designed to receive. The shape of both the front and rear support assemblies 5, 9 are adapted to the shape of the item to be received by the mounting system 1. Note that the term front and rear with regard to front and rear support assemblies 5, 9 are used for convenience purposes; multiple mounts in a variety of configurations can be used which provide the requisite stability, and accessibility in mounting and dismounting an equipment item positioned in proximity to a user's orientation and positioning in question e.g., in a turret or other aperture or other positioning/seating arrangement.

In this embodiment, the rear support assembly 9 receives a different section of an equipment item which is coupled to the front support assembly 5. For example, rear support assembly 9 is formed with a structure that couples to the base plate 3, and an opposing end section that has an equipment item stabilization structure/retaining frame comprising a U-shaped interface structure with multiple cushions 23, 27A, 27B configured to receive an equipment item. In this example, the cushions comprise a lower rest cushion 23 (e.g., rifle butt stock rest) supported by a protrusion section forming a planar structure or base and adapted to conform and cushion a bottom section of an equipment item (e.g., a rifle butt stock), as well as two side rest cushions 27A, 27B (e.g., rifle butt stock side cushions) which are coupled to side walls (i.e., first and second attachment sections) that extend laterally in the U-shape receiving structure. The receiving structure can alternatively have a single sidewall and a single side rest cushion 27B. The lower and side cushions 23, 27A/27B in this embodiment are made from Sorbothane® material or Santoprene™ rubber which has an approximate durometer of 55 A. The front cushion 7A (FIG. 9) can also be made from the same materials as the other cushions 23, 27A, 27B.

The rear support assembly 9 further includes a coupling structure or repositionable equipment item retaining system 25 (e.g., a stretchable or elastic strap) that is pulled over the top of an equipment item (e.g., rifle butt stock), and attaches on one end to a coupling mechanism 29 (e.g., half spherical/cup/hook, hereinafter referred to as "strap hook"). The strap 25 is adapted to produce a plurality of retaining forces along a plurality of axes on the equipment item received within cushions 23, 27A, 27B of the stabilization structure. In this embodiment, the strap hook 29 is formed in a half circle/sphere/cup form which is coupled with and extends laterally from the side of the rear support assembly 9. The strap hook 29 in this embodiment is extruded to form a half-cup form with a portion of the side/top cut away with the cup form facing substantially towards a plane formed by the base plate 3 for receiving a spherically shaped portion of the strap 25. See FIG. 5 for an example of the strap hook 29 described above. See FIG. 6 for an example of the spherical section in the strap 25 described above which fits into the FIG. 6 strap hook.

The example in FIG. 1 uses a flexible/stretchable strap as the coupling mechanism 25 which has an integral handle 25A at one end of the strap 25 and an approximately spherical section 25B formed near the handle 25A. The handle 25A is formed on one end of the strap 25 with a coupling section 25C on the other end which attaches the strap 25 to the rear support assembly 9 using a strap pin 30. The strap pin 30 and strap coupling section 25C are inserted into a top section of the rear support assembly 9 that is on an opposite side of the rear support assembly 9 than the strap hook 29. See FIG. 6 for an example of the spherical section 25B and handle 25A of the strap 25 in this embodiment. An exemplary embodiment of the strap pin 30 is shown in FIG. 11 and can be made from stainless steel.

A user can pull/stretch the strap 25 in order to extend the spherical section 25B in the strap 25 past the strap hook 29 and into the center of the half circle section of the strap hook 29; then a user allows the strap 25 to retract in order to then place the spherical section 25B of the strap 25 into the strap hook section 29 to secure strap 25 in place. To remove an equipment item, a user then pulls the strap 25 down and away from the strap hook 29 then pulls the strap 25 away from the equipment item e.g., rifle butt. The strap 25 in this embodiment can be made from natural rubber but can also be made from ethylene propylene diene monomer (EPDM) rubber as well for moderate to hot climates and to better resist ultraviolet degradation. A retractable ribbon, cable, or strap as well as other forms or types of elastic strands/cable can also be used as an alternative to the embodiment described herein.

The front and rear support assemblies 5, 9 are coupled to the base plate 3 with screws or other types of fasteners that go through the base plate 3 and couple into the support assemblies 5, 9. A thread locking compound or structure can be used or applied to the threads in the support assemblies or into fasteners which are used to couple the support assemblies 5, 9 to the base plate 3. Thread lock structures or compounds may provide extra gripping power on fasteners so that vibrations and collisions do not loosen the fasteners (e.g., lock washers 35 in FIG. 2).

The base plate 3 is held to a structure (not shown) upon which the mounting system 1 is mounted (e.g., a vehicle), with nylon insert nuts 17 and washers 15 that attach to non-invasive fasteners, illustratively adhesive bonded fasteners 13. Adhesive bonded fasteners 13 can comprise metal, plastic, fiberglass, carbon composite, etc. studs which have a base section on one end (e.g., see FIG. 2) and a threaded stud/protrusion that rises from the base section. The base section of the adhesive bonded fasteners 13 is adhered to an underlying structure (not shown, e.g., a vehicle surface) and nuts 17 and washers 15 are screwed/placed on the threaded section of the adhesive bonded fastener 13 to permit installation and later removal. Increasing the size of the base of the adhesive bonded fasteners 13 increases the amount of force that can be applied to the fasteners without detachment of the fasteners from a receiving structure the fasteners are attached to. Thus, varying sizes of adhesive bonded fasteners may need to be used based on an analysis of kinematic forces applied to the mounting system by environmental factors or movement of the receiving structure the mounting system is attached to. Different adhesive fastener stud materials and adhesives may also be selected based on anticipated loading, environmental factors e.g., blast damage events, and applied kinematic forces of the mounting system.

Adhesive bonded fasteners 13 can be applied to a surface of a structure (e.g., see FIGS. 12, 13) (e.g., a vehicle top) using an installation device that aligns and holds the adhesive bonded fastener in position and applies a predetermined or controlled pressure to the fastener while the adhesive bonding material cures. After installation of the adhesive bonded fasteners is completed, the installation device is removed and the mounting system 1 is coupled to the adhesive bonded fasteners 13 using nylon insert nuts 17 and washers 15. The adhesive bonded fasteners avoid a need for drilling, welding or otherwise damaging a structure the mounting system 1 is to be mounted upon and also provides strong, leakproof, and corrosion resistant coupling with a underlying structure the mounting system 1 is attached to. Adhesives which are used with the adhesive bonded fasteners 13 can include acrylic, bismaleimide, and epoxy adhesives.

Examples of adhesive bonded fasteners use with the invention include using threaded set screws or studs attached to a flat plate. Double sided tape can also be used in addition to liquid or paste adhesives. The installation tool holds the fastener securely in place until the adhesive is cured. A special hole-pattern that is tightly spaced together is needed for this exemplary embodiment and application. In particular, the exemplary mounting holes in the mounting system 1 base plate 3 are used to locate the adhesive bonded fasteners on a structure upon which the mounting system 1 is coupled with during installation. Testing was performed to verify the attachment strength of the adhesive bonded fasteners. The large surface areas of the fasteners in combination with proper surface preparation and structural acrylic adhesive proved to sufficient for holding the exemplary embodiment in place.

Set screws 19 are coupled to the base plate 3 for use to store washers 15 and nylon insert nuts 17 when the mounting system 1 is not mounted on a structure e.g., a vehicle.

Figure 2:
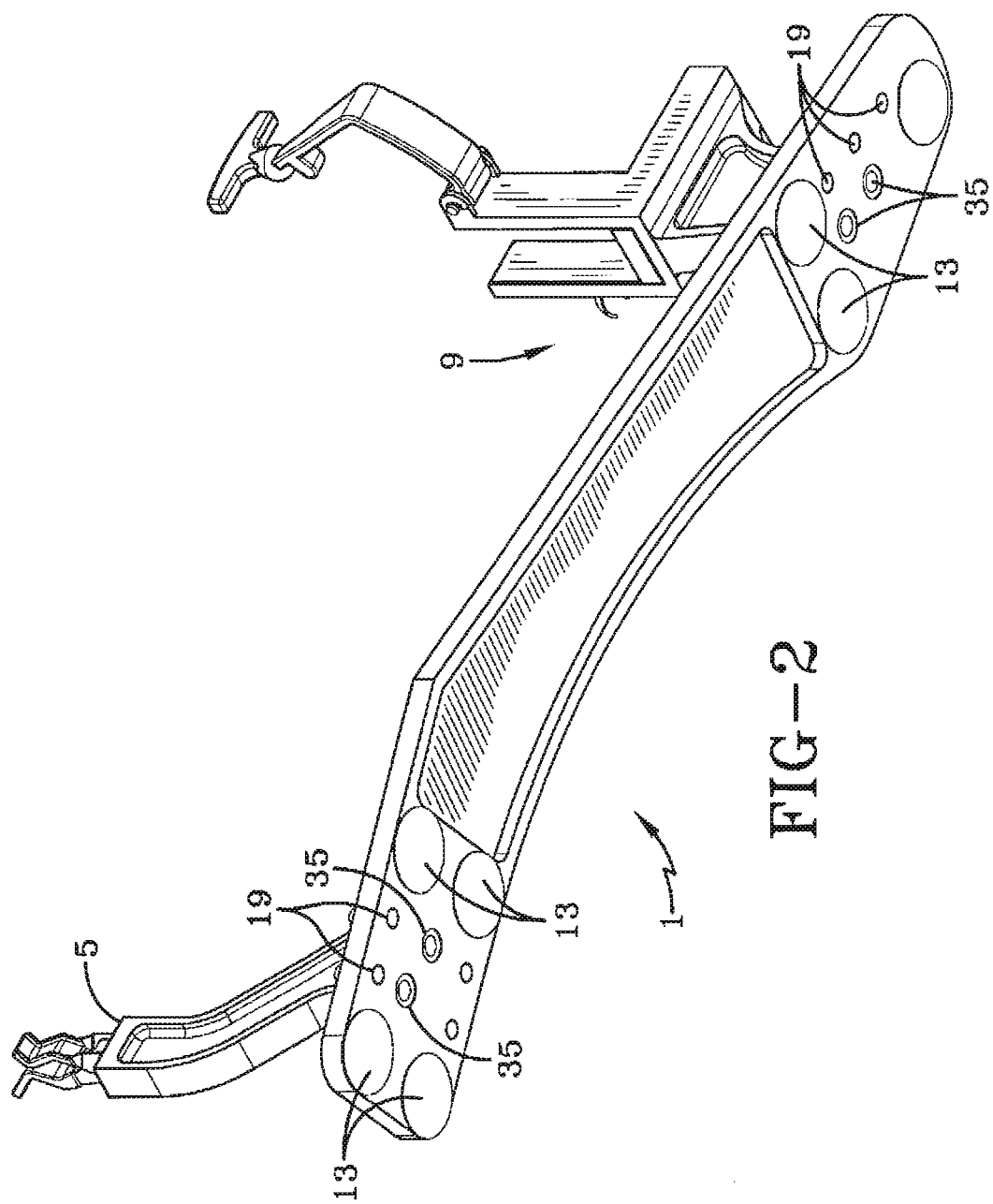
FIG. 2 shows a perspective view of a lower portion of the FIG. 1 embodiment.

FIG. 2 shows the mounting system 1 embodiment of FIG. 1 from a bottom isometric perspective. A lower section of base plate 3 (Side B from FIG. 1) is shown with the bottom portion of the adhesive bonded fasteners 13 installed in base plate 3 which are adhesively bonded to a structure (not shown) when such system is actually installed on a receiving structure such as a vehicle upper surface (e.g., see FIGS. 12, 13). A view of set screws 19 are shown installed in the lower face of base plate 3. An installed view of the fasteners 35 which couple the front and rear support assemblies 5, 9 to base plate 3 are also shown in an installed position.

Figure 3:
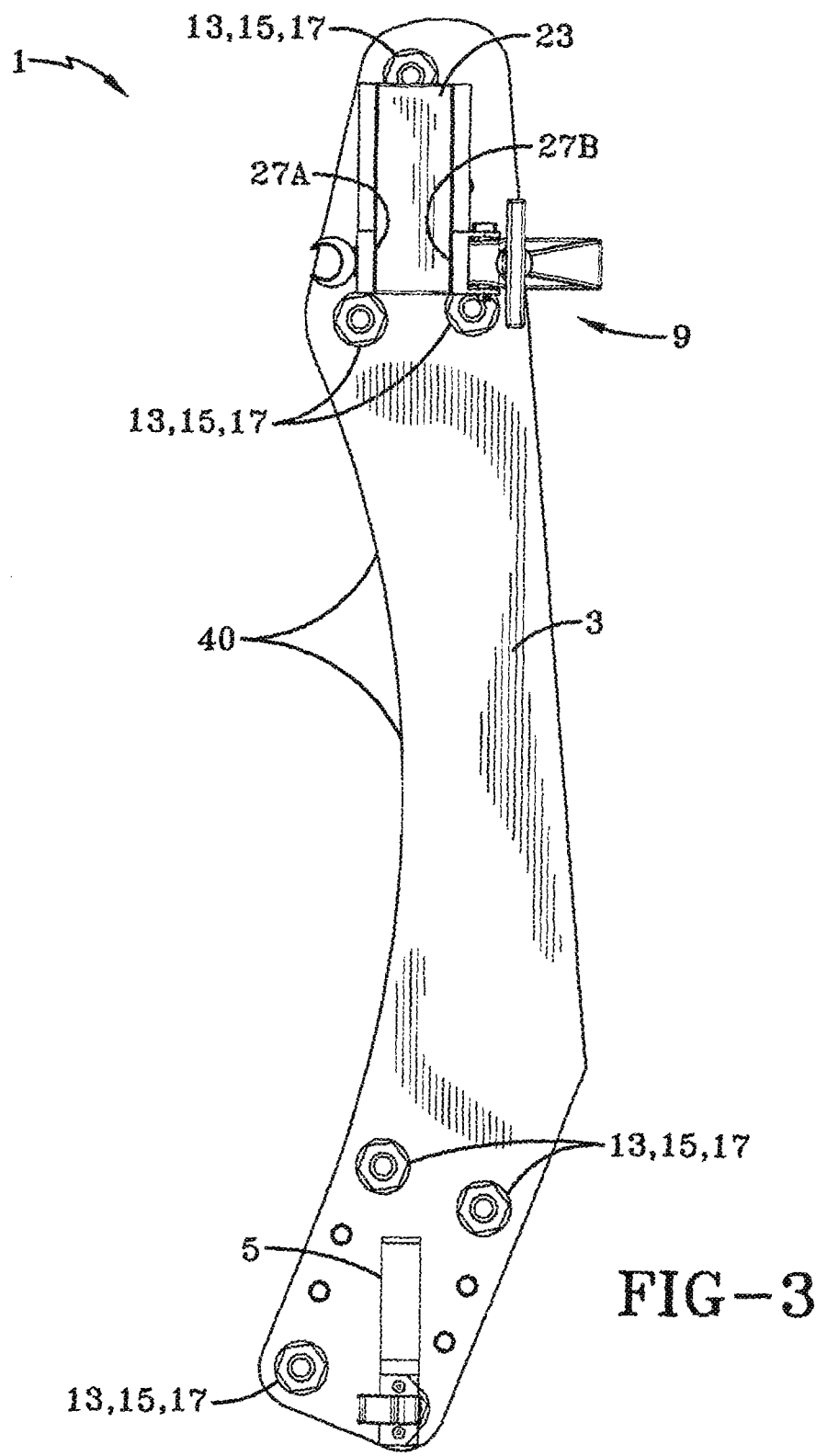
FIG. 3 shows a top view of an exemplary embodiment of the invention such as shown in FIG. 1.

FIG. 3 shows a top view of the mounting system 1 embodiment shown in FIG. 1. A top view of base plate 3 is shown with a curved section 40 (i.e., Side C in FIG. 1) which is designed to fit the mounting system 1 in close proximity to an arcuate, aperture structure, e.g., a turret on an armored vehicle, and thereby reduce mounting area footprint. This curved section 40 of base plate 3 permits mounting of an equipment item closer to such an aperture or user accessible structure. An entire base plate 3 can be curved or merely one side of it can be curved or shaped based on an underlying or adjacent structure's geometry or based on another design consideration related to a user or user aperture/access needs. The base plate 3 is also shown with a top view of the nylon insert nuts 17 and washers 15 that attach to the adhesive bonded fasteners 13.

FIG. 4 illustrates the mounting system 1 as in FIG. 1 for receiving nuts 17 and washers (not shown) installed on set screws 19. This figure shows an orientation or configuration that the mounting system 1 would be after removal from the adhesive bonded fasteners 13 (not shown).

Figure 5:
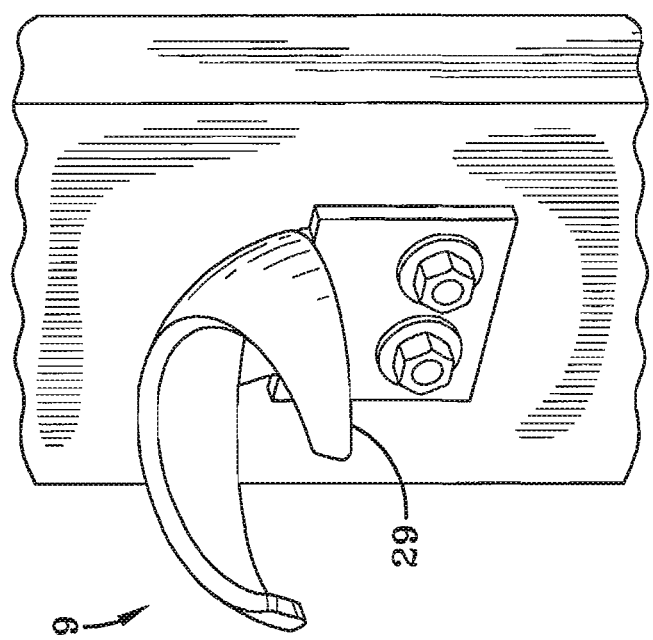
FIG. 5 shows one embodiment of a coupling mechanism for portion of a retaining mechanism used with an embodiment of the invention such as shown in FIG. 1.

FIG. 5 shows a perspective view of the FIG. 1 strap hook 29 mounted on rear support assembly 9.

Figure 6:
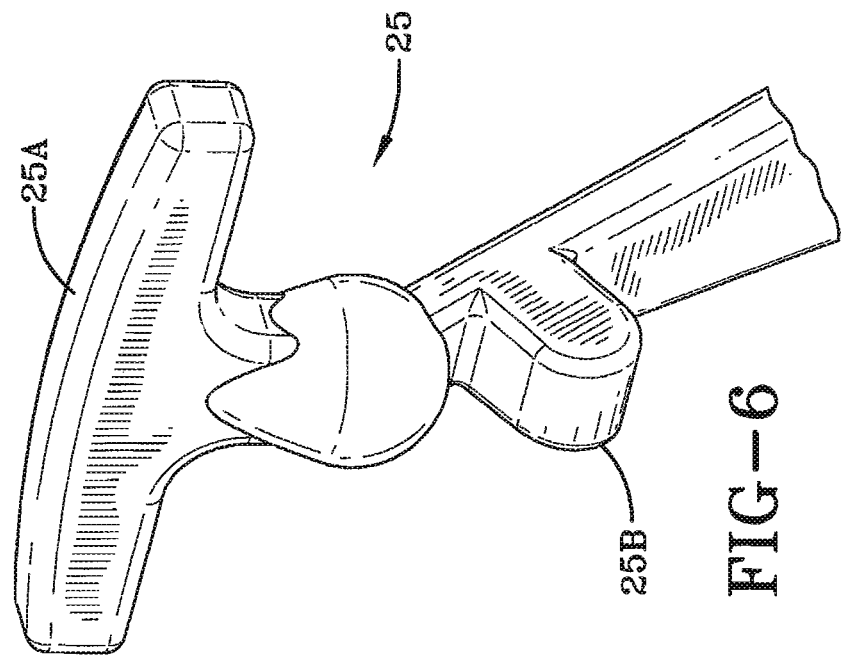
FIG. 6 shows one embodiment of a portion of retaining mechanism used with an embodiment of the invention such as shown in FIG. 1.

FIG. 6 shows a perspective view of strap 25 with a detail view of the strap handle 25A and the strap spherical section 25B which engages the strap hook 29.

Figure 7:
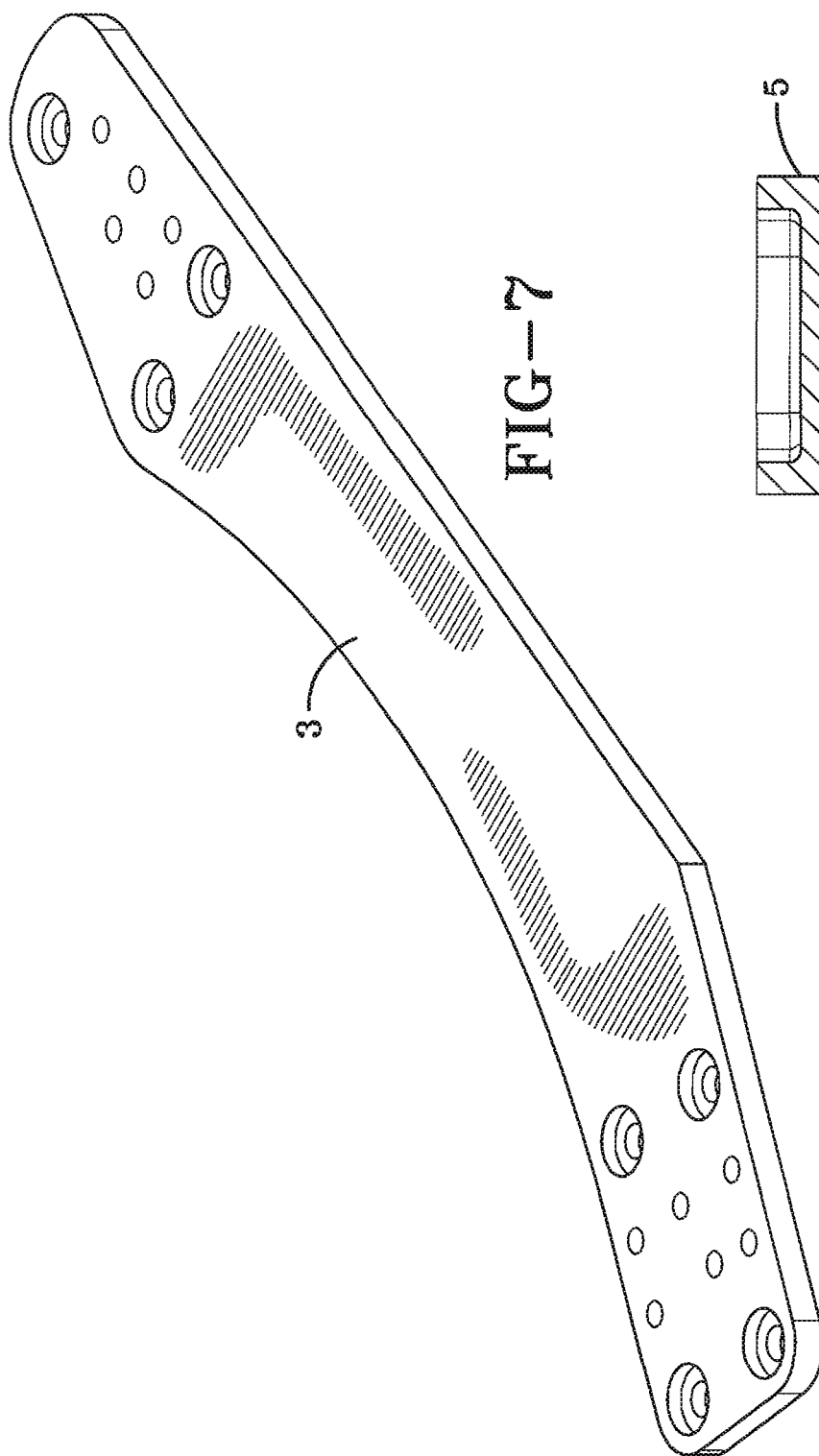
FIG. 7 shows a perspective view of a base plate such as used in an embodiment of the invention as shown in FIG. 1.

FIG. 7 shows a perspective view of the FIG. 1 base plate 3 with the drilled holes for set screws 19, fasteners 35, and adhesive bonded fasteners 13.

Figure 8:
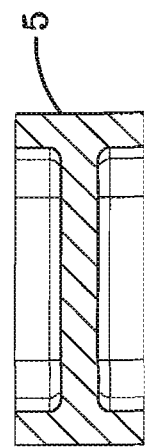
FIG. 8 shows a cross sectional view of a mounting armature or extension used with on embodiment of the invention such as shown in FIG. 1.

FIG. 8 shows a cross-sectional view of the front support assembly 5 as shown in FIG. 1. The front support assembly 5 cross-section shows an I-beam shape to the cross section which provides required strength and provides weight reduction for the mounting system 1.

Figure 13:
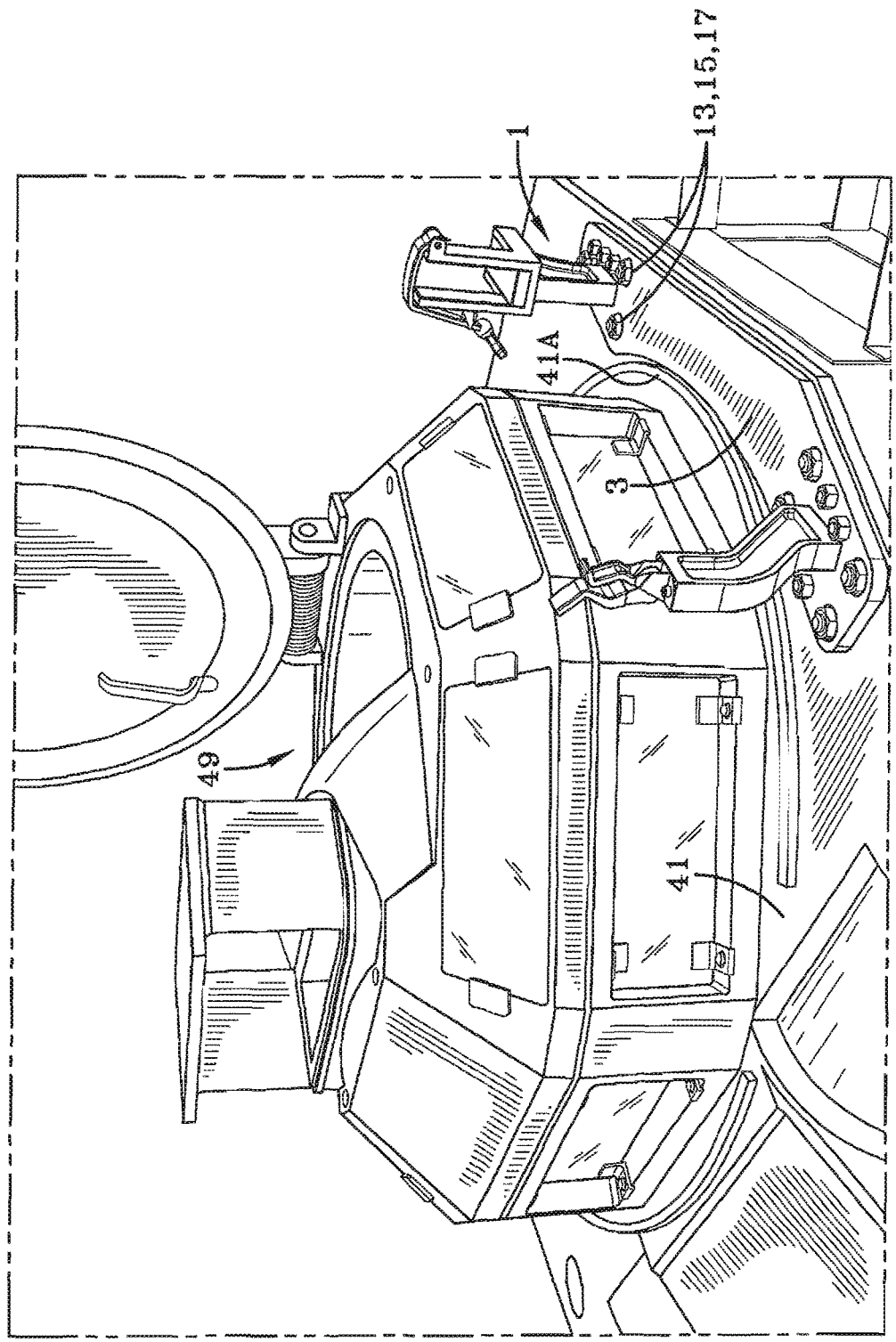
FIG. 13 shows a perspective view of the hatch structure with an embodiment of the invention such as shown in FIG. 12.

FIG. 9 shows a front view of the FIG. 1 mounting system 1 as it would be seen installed on a structure or vehicle (FIGS. 12 and 13). Front support assembly 5 is shown with spring clamp 7 on top of the front support assembly 5. A cushion 7A is shown between the arms of spring clamp 7 in the area where the clamp 7 couples with the top of the body of the front support assembly 5. The sides of the rear support assembly 9 are shown extending on either side of the front support assembly 5 with rear support assembly 9, side cushions 27A, 27B and lower cushion 23 shown. The lower part of the adhesive bonded fasteners 13 are also shown underneath the base plate 3 as they would be viewed in an installed position.

FIG. 10 shows a perspective view of the FIG. 1 rear support assembly 9 prior to installation onto the base plate 3 and without other installed components. Mounting holes 52 for the strap hook 29 are shown as well as the mounting holes and section 28 in rear support assembly 9 where strap 25 is attached with the strap pin 30.

FIG. 11 shows the strap pin 30 with a retaining clip hole 53 that is used to secure the strap pin in position after installation using a cotter pin or other similar retainer device (not shown).

FIG. 12 shows a side view of an armored vehicle turret 41 with an embodiment of the mounting system invention 1 such as shown in FIG. 1. Base plate 3 is shown with front and rear support assemblies 5, 9 coupled to the armored vehicle turret 41 next to a user access hatch 49.

FIG. 13 shows a perspective view of the armored vehicle turret 41 shown in FIG. 12. Base plate 3 is shown coupled to an outer surface of the turret 41, with the curved section 40 of base plate 3 fitted to conform with a curved section 41A of the turret 41 (e.g., the curved section 40 of base plate 3 is further shown in FIG. 3). Front and rear support assemblies 5, 9 are shown coupled to the base plate 3 with an equipment item (i.e., a rifle 47) installed in the mounting system 1 with the rifle barrel in the spring clamps 7 of front support assembly 5 and rifle butt inserted into the rear support assembly 9.

Regarding utilization of the mounting system 1 such as shown in FIG. 1, after the mounting system 1 is installed on a vehicle, e.g., a turret surface, an equipment item (e.g., a rifle) can be loaded in the mounting system 1 by snapping a front portion into the quick release structure, e.g., spring clamp 7, as shown, for example, in FIG. 13. Stretching the retaining strap 25 over the top of the gun and placing the spherical section 25B into the strap hook 29 forces a portion of the equipment item into the rear support assembly 9. This squeezes the equipment item between strap 25 and cushion 23 creating a very strong hold on the equipment item (e.g., gun butt stock). The removal of the mounted equipment item is opposite of the installation.

An embodiment of the invention, such as shown in FIG. 1, weighs approximately 5 pounds and is a negligible addition to a structure the invention is attached to. One advantage of the invention is that once mounted, it can be easily removed with standard tools. Additionally, the simple mounting scheme allows for easy replacement if the unit becomes damaged. The rear mounting strap and forward quick release, e.g., mounting clip, allow for quick removal an equipment item from the invention.

Because of its location in proximity to a user access aperture, e.g., on a left side of a turret, any mishandling of the equipment item while reaching for it would cause the item to simply fall on top of the user access aperture, e.g. turret, or other part of the vehicle or structure and not down the front or off the side as was the case with existing systems.

Further, depending on the mission and specific user, there are numerous equipment items or configurations including lasers, flashlights, and payload launchers which can be used with the invention. The system's mounting base can be modified to permit use with other types of vehicles or structures with user apertures. Modifications to the geometry of the structure which receives an equipment item can compactly accommodate a wide variety of portable and human repositionable systems.

This invention can be used with fixed sites, vehicles, ships, aircraft, spacecraft, or other mobile structures having user apertures. Examples of vehicles with apertures or turrets can include, for example, tanks, armored personal carriers (APC) and all terrain vehicles. An adaption of this invention can also be used on law enforcement vehicles in hostile cities or countries that require a higher powered weapon, hose system, laser, or man portable/repositionable/mobile system is at the ready in proximity to a user in a vehicle or fixed site.

Other applications can include oil well drilling systems where tools or equipment must be at a ready position where a user is positioned to take a required urgent or emergency action. An embodiment of the mounting system invention can be placed on aircraft such as helicopters as well as ships e.g., harpoon system, firefighting hose, animal snares for large game, etc.

Other alternative embodiments can include substituting sections of the rear support structure with a variety of adjustable jaws such as spring loaded jaws which can substitute for the strap system.

Additional embodiments can add a locking feature which impedes removal by unauthorized personnel such a by adding a lock mechanism. An alarm system can also be added to alert users of tampering with equipment items in the mounting system. A variety of alarm systems can be utilized including pressure switches, motion sensors, light sensors, or magnetic switches which can be positioned on the mounting system. Remote locking and unlocking systems can be added to the invention as well which permits a user to remotely secure or make an equipment item available for quick access.

The front support assembly can be designed to be extendable via a variety of means such as a telescoping structure, longitudinal members which can be substituted with quick release pins on either end of the front support assembly, a lockable swing arm which has a pivoting mechanism on either end which permits rotation of the front support assembly along an arc in parallel with the base plate 3 with the mounting section permitting locking in place and the clamp design to rotate to provide a desired orientation to an equipment item being mounted. Pins, adjustable friction locks, or other means can be used to provide the locking effect for the front support structure. The front support structure can also be mounted such that it swings laterally or sideways to lie flat or in a position rather than substantially perpendicular to a surface that the mounting system 1 is coupled with. An alternative embodiment of the invention can thus be mounted on a side section of an underlying structure rather than a top section. One embodiment of the side swinging embodiment can be provided via a hinge structure on the side of the base plate 3. Additionally, a second plate can be coupled to the base plate 3 which is coupled to the front and rear support assemblies 5, 9.

The system can be designed to couple to a motorized system which can position an embodiment of the invention as desired by means of a remote control. This motorized version can attach an actuator system or arm to a section of the mounting system 1 to position it as desired. A control system would be placed in a remote location and can be coupled wirelessly or via a wire system. A control system including a power source or power controller as well as an input/output system can be coupled to the system to permit operation of the system.

The latching systems e.g., clamp 7 and strap 25/strap hook 29 combination can individually or both be replaced with an electromechanical control system which permits remote actuation of the quick release or retention function such as if there was a robotic arm used in connection with the system. An input/output system which is coupled to a control mechanism can include wired connectivity, wireless connectivity, or other forms of communication such as induction fields, etc to communicate between a user and the alternative embodiment of the invention's latching control section.

An alternative embodiment of the invention can be designed to operate in hostile environments where a cover can be placed on or in proximity to a mounting system to protect an equipment item which has been mounted in the mounting system 1. A cover can include clam shells that are on either side of a mounted equipment item which provide protection against environmental threats or ballistic shrapnel or other threats including chemical, sand or particulate, or other types of contaminants. The cover can be designed to permit a user to reach into a top aperture in the cover and pull a mounted equipment item out of the cover structure. A flexible or repositionable cover can be on top of the cover system that encloses an equipment item to permit a user to push their hand or hands into the access aperture then pull the equipment item out. The cover can be made out of flaps that overlap or a spring loaded cap which displaces when pushed aside or an equipment item is withdrawn from the mounting system 1.

A series of sacrificial layers or membranes can be used as well which is designed to permit an equipment item to be pulled through the membrane or layer. One embodiment of this can have a serrated or alternating cut line placed in the membrane or layer which creates a weakness in the layer so when the equipment item is withdrawn the serrated portion cut into the layer/membrane permits a user to pull an equipment item through the membrane/layer with greater ease. An embodiment can include provision for replacement layers or membranes reapplied over an equipment item withdrawal aperture.

One or more flexible or spring loaded panels or cover sections can be used which accommodate movement between a closed position and an open position with the panels or cover sections moving upward, downward, laterally, or otherwise positionable to permit quick extraction of an equipment item stored in the mounting system 1. The cover section can be made from materials which provide ballistic protection similar to ceramic panels which have Kevlar® coatings applied to distribute kinetic impacts laterally and prevent objects from impacting a stored equipment item.

In addition to an enclosing cover, a single protective panel can be used which is placed in a direction where a threat is most anticipated. For example, a kinetic or ballistic protection panel can be placed on one side of the mounting system 1 which faces a potential threat.

Although the invention has been described in detail with reference to certain preferred embodiments, variations and modifications exist within the spirit and scope of the invention as described and defined in the following claims.

The invention claimed is:

1. A method of mounting an equipment item comprising:
determining a plurality of kinematic forces applied to a mounting system that are transmitted from an equipment mounting section of a vehicle, said equipment mounting section comprising a first surface area of a receiving structure of said vehicle comprising a planar section and a first and second opposing boundary section, said vehicle comprising a user access structure configured to enable a user to selectively move, remove, and operate said equipment item from said mounting system while sitting in, standing in, or exiting from said user access structure and optionally operate said equipment item from said mounting system within said and selectively entering or exiting said vehicle through said user access structure, wherein said user access structure is formed and disposed in contact with and extending vertically away from one side of said first surface area, said receiving structure of said vehicle further comprising a propulsion system comprising ground engaging sections configured to receiver motive power from said vehicle to enable said ground engaging sections to engage with a ground section underneath said vehicle, wherein said first surface area is on an opposing side of said vehicle from said ground engaging sections, said receiving structure transmits at least some of said plurality of kinematic forces to said equipment item through said mounting system, wherein said first surface area defines an area between said first and second opposing boundary sections partially surrounding a curved area of a first sidewall section of said user access structure, wherein said first surface area comprises a shelf area between said first sidewall section of said user access structure and opposing edge portions of said shelf facing away from said first sidewall section;

determining an available mounting position and mounting footprint for a moveable equipment item on said receiving structure comprising said first surface area that is bounded by said first and second opposing boundary sections in relation to said user access structure based on said plurality of kinematic forces impact on a plurality of failure modes of said mounting system attachment to said first surface area of said receiving structure, a first orientation axis on said receiving structure defining a vehicle operation orientation as it traverses in one direction under power of said propulsion system as well as a second orientation of said moveable equipment item determined based on said user operational position and exit position through said user access opening in relation to said user access structure which requires said user to pass through said user access structure and have immediate access to the moveable equipment item within reach of said user while said user is within and extending or exiting from the user access structure;

providing said mounting system comprising:

a first plurality of fasteners, wherein said first plurality of fasteners comprise adhesive bonded fasteners each comprising a base portion adapted to adhesively couple with said receiving structure so as to maintain said mounting system in a fixed orientation and coupling with said first areas of said receiving structure up to application of at least some of said plurality of kinematic forces, a first threaded protrusion, and a threaded nut which screws onto said threaded protrusion;

a base plate formed with a form that is formed with a shape comprising a first side and a second opposing side that conforms to said first and second opposing boundary sections and partially surrounds said user access structure, said first plurality of fasteners are adapted to withstand said plurality of kinematic forces and maintain structural integrity, and with a plurality of apertures adapted to receive said first plurality of fasteners, wherein each said base portion is formed having a contact section that adhesively couples with said receiving structure having a diameter that is at least twice a diameter of said first threaded protrusion of said first plurality of fasteners;

a first mounting structure comprising a clamping mechanism and a first moveable equipment item mount interface structure coupled to said first mounting structure in proximity to or within said clamping mechanism, said clamping mechanism is adapted to releasably couple a first section of said moveable equipment item in proximity to a first end of said moveable equipment item with said first mounting structure; and a second mounting structure comprising:

a body comprising a protrusion section and a holding structure, said protrusion structure has a first and second protrusion section, wherein said first protrusion section is coupled with said base plate and said second protrusion section has a plurality of holding structure sides defining side walls with an opening facing away from said receiving structure that has cushion material disposed on said holding structure sides that is dimensioned to receive said moveable equipment item in proximity to a second end of said moveable equipment item so that said moveable equipment item is held so that it does not move laterally and has a lower support which extends away from the holding structure sides so as to support a lower portion of said second end of said moveable equipment item;

a moveable retaining structure having a first and second portion which is adapted to produce a restoring or retraction force which tends to retract or pull opposing ends of said moveable retaining structure when placed into a predetermined position adapted to retain a portion of said moveable equipment item in relation to said second mounting structure;

a first attachment section formed or disposed on one side of said second mounting structure adapted to receive said first portion of said moveable retaining structure;

a second attachment section formed or disposed on another side of said second mounting structure on an opposing side of said first attachment section is located on said second mounting structure, said second attachment section is adapted to receive said second portion of said moveable retaining structure, wherein said moveable retaining structure is formed as a stretch strap having a half spherical portion on one end with a handle protrusion adjacent to the half spherical portion, the handle protrusion is formed to extend at an angle oriented towards said user access structure from said stretch strap when disposed in said second mounting structure, wherein said second attachment section is formed such that it is formed into a semi-circular structure with an open side which receives a portion of said stretch strap adjacent to said half spherical portion opposing said handle protrusion through said open side when said stretch strap is stretched then holds said half spherical structure when the pull force on said stretch strap is reduced;

a second equipment item mount interface structure coupled with a section of said first protrusion section and in proximity to said first and second attachment section;

wherein the first and second mounting structures are coupled to said base plate on one side of said base plate;

wherein said first and second mounting structures are further adapted to receive and releasably hold said moveable equipment item such that said moveable equipment item can be released in a direction comprising a first direction after an application of force is applied to said moveable equipment item and said moveable retaining structure is manipulated to reposition said retaining structure away from second attachment point;

wherein said plurality of apertures in said base plate comprise a first and second plurality of apertures, said first plurality of apertures are located in said base plate based on a determination of available mounting area of said first surface area of said receiving structure between said first and second opposing boundary sections that said mounting system is adapted to be coupled with which is no greater than the outer footprint of said base plate and a predetermined distribution of force comprising at least said plurality of kinematic forces transmitted from said first and second mounting structures to said base plate and then to said first plurality of fasteners required to maintain said movable equipment item in a fixed position relative to said receiving structure when a predetermined force is transmitted to said movable equipment item through said mounting system after it is mounted upon said receiving structure on said first surface area, wherein said first and second plurality of apertures are formed within opposing end sections of said base plate that partially surround said user access structure, wherein said first and second plurality of apertures respectively are disposed around said first and second mounting structures in said base plate;

placing a first section of said movable equipment item in said clamp with contact with said first equipment item mount interface structure and a second portion of said movable equipment item in said second equipment item mount interface structure;

manipulating said moveable retaining structure into said predetermined position that couples one end of said moveable retaining structure with first attachment point and said second end of said moveable retaining structure with said second attachment point;

wherein said first mounting structure is coupled to said base plate at a first coupling location, said first mounting structure is formed so that said clamping mechanism is positioned to laterally offset said clamping mechanism away from a section of said base plate at said first coupling location along an axis formed by a first line drawn between said first and second mounting structures and farther away from a second line perpendicular to said base plate and extending up and away from said first coupling location.

2. A method of mounting an equipment item as in claim 1, wherein said first and second mounting structure are adapted to position a first and second point of said movable equipment item in a first plane comprising a plane parallel to a second plane defined by said base plate.

3. A method of mounting an equipment item as in claim 1, further comprising providing a plurality of second threaded protrusions adapted to receive said threaded nuts, said plurality of second threaded protrusions are coupled to said base plate in a different section than said first plurality of fasteners.

4. A method of mounting an equipment item as in claim 1, wherein said base plate is adapted to conform to a portion of an outer edge of said first surface area of said receiving structure having an aperture which said base plate is coupled to position said mounting system in a predetermined orientation to said aperture such that said mounting system positions said moveable equipment item so that it does not obstruct said aperture.

5. A method of mounting an equipment item as in claim 1, wherein said first mounting structure is coupled to said base plate using a second plurality of fasteners, wherein said mounting system further comprises a thread locking compound or structure, said locking compound or structure is adapted to be used with said second plurality of fasteners to reduce loosening of said second plurality of fasteners when said mounting system has said plurality of kinematic forces applied to it in multiple axis as said vehicle traverses over uneven terrain.

6. A method of mounting an equipment item as in claim 1, wherein moveable retaining structure is an elastic strap comprising a handle, a spherical structure, and an attachment point adapted to receive a locking pin.

7. A method of mounting an equipment item as in claim 1, wherein said first and second mounting structures positioning are further determined based on a plurality of characteristics of said movable equipment item comprising weight distribution of said removable item and an orientation of said removable item with regard to said receiving structure which said mounting system is mounted in proximity with.

8. A method of mounting an equipment item as in claim 1, further comprising providing a locking system adapted to restrict removal of said moveable equipment item from said mounting system.

9. A method of mounting an equipment item as in claim 1, wherein said moveable equipment item comprises a weapon assembly.

10. A method of mounting an equipment item as in claim 9, wherein said weapon assembly is a projectile firing system comprising a magazine adapted for receiving and delivering a plurality of bullet cartridges into said weapon assembly, wherein said mounting system holds said weapon assembly with a receiving port for said magazine oriented towards said receiving structure, wherein said first and second attachment section are formed to hold said weapon assembly away from said base plate such that said magazine can be inserted into said weapon assembly receiving port when said weapon assembly is held in said mounting system.

11. A method of mounting an equipment item as in claim 10, further comprising said plurality of bullet cartridges disposed within said magazine.

12. A method of mounting an equipment item as in claim 1, wherein said receiving structure is a portion of an armored vehicle.

13. A method of mounting an equipment item as in claim 1, further comprising a protective structure having a wall section that surrounds at least one side of mounting system and said moveable equipment item facing away from said user access structure.

14. A method of mounting an equipment item, as in claim 13, wherein said wall section further surround at least three sides of the mounting system and said moveable equipment item.

* * * * *